(12) United States Patent
Boulden et al.

(10) Patent No.: US 11,118,596 B2
(45) Date of Patent: Sep. 14, 2021

(54) WEAR RING FOR USE IN A PUMP

(71) Applicant: Boulden Company, Inc., Conshohocken, PA (US)

(72) Inventors: Brian Boulden, Conshohocken, PA (US); Robert Aronen, Conshohocken, PA (US)

(73) Assignee: Boulden Company, Inc., Conshohocken, PA (US)

( * ) Notice: Subject to any disclaimer, the term of this patent is extended or adjusted under 35 U.S.C. 154(b) by 70 days.

(21) Appl. No.: 16/194,340

(22) Filed: Dec. 15, 2018

(65) Prior Publication Data

US 2019/0128275 A1    May 2, 2019

Related U.S. Application Data

(63) Continuation-in-part of application No. 15/990,841, filed on May 29, 2018, which is a continuation-in-part of application No. 14/583,912, filed on Dec. 29, 2014, now Pat. No. 9,982,683.

(51) Int. Cl.

| | |
|---|---|
| F04D 29/16 | (2006.01) |
| F04D 29/22 | (2006.01) |
| F04D 29/10 | (2006.01) |
| F16L 57/06 | (2006.01) |
| F04D 29/12 | (2006.01) |
| F04B 7/00 | (2006.01) |
| F16J 15/40 | (2006.01) |
| F04D 7/02 | (2006.01) |

(52) U.S. Cl.
CPC .......... F04D 29/167 (2013.01); F04B 7/0096 (2013.01); F04D 29/106 (2013.01); F04D 29/126 (2013.01); F04D 29/2266 (2013.01); F16J 15/40 (2013.01); F16L 57/06 (2013.01); F04D 7/02 (2013.01); F05D 2240/55 (2013.01)

(58) Field of Classification Search
CPC ...... F04D 1/06; F04D 13/0633; F04D 25/062; F04D 29/04; F04D 29/046; F04D 29/0462; F04D 29/05; F04D 29/056; F04D 29/0563; F04D 29/10; F04D 29/106; F04D 29/12; F04D 29/126; F04D 29/128; F04D 29/2266; F05D 2240/55; F16C 17/02; F16C 17/18; F16C 33/20; B29D 99/0053; F16J 15/441
See application file for complete search history.

(56) References Cited

U.S. PATENT DOCUMENTS

| | | | | |
|---|---|---|---|---|
| 1,743,645 A | * | 1/1930 | Whiteley | F16C 33/26 384/285 |
| 1,751,906 A | * | 3/1930 | Hall | B21D 53/00 384/285 |

(Continued)

*Primary Examiner* — J. Todd Newton, Esq.
*Assistant Examiner* — Sang K Kim
(74) *Attorney, Agent, or Firm* — Inspired Idea Solutions Law Firm

(57) ABSTRACT

A device is disclosed including a wear ring formed as a hollow cylinder with an inside diameter and an outside diameter. The hollow cylinder may have multiple holes through at least a portion of the wear ring from the inside diameter towards the outside diameter. The multiple holes may be passages between the inside diameter and the outside diameter that allow fluid under pressure to pass between the inside diameter and the outside diameter through the multiple holes.

20 Claims, 10 Drawing Sheets

(56) References Cited

U.S. PATENT DOCUMENTS

| | | | | |
|---|---|---|---|---|
| 3,058,787 | A | * | 10/1962 | Bernson .................. F16C 33/10 384/287 |
| 6,241,393 | B1 | * | 6/2001 | Georges .................. F16C 33/20 384/130 |
| 6,981,799 | B2 | * | 1/2006 | Sturm .................... F04D 29/026 384/297 |
| 2007/0009757 | A1 | * | 1/2007 | Takayama ............. B22F 1/0003 428/644 |
| 2010/0013167 | A1 | * | 1/2010 | Bachhofner ........... F16J 15/406 277/558 |
| 2016/0327090 | A1 | * | 11/2016 | Shibamiya .............. F16C 33/24 |
| 2017/0108399 | A1 | * | 4/2017 | Rhee ........................ G01M 3/38 |
| 2019/0293080 | A1 | * | 9/2019 | Klima .................. F04D 29/056 |

* cited by examiner

WEAR RING FOR USE IN A PUMP

CROSS REFERENCE TO RELATED APPLICATIONS

This application is a continuation in part of U.S. patent application Ser. No. 15/990,841, filed on May 29, 2018, which is a continuation in part of U.S. patent application Ser. No. 14/583,912, filed on Dec. 29, 2014 and issued as U.S. Pat. No. 9,972,683 on May 29, 2018, and entitled Bushing Seal For Use in a Pump; the entirety of which is hereby incorporated by reference herein.

BACKGROUND

Field of the Invention

This disclosure relates to pumps, and more specifically to wear rings and seals for pumps that act as high differential pressure seals within a pump such as a centrifugal pump.

Background

Pumps, such as centrifugal pumps, operate with a motor connected to a shaft, which is connected to an impeller. Movement of the impeller creates pressure within a housing and causes fluid to flow. For example, a pump is used to move water in a heating system, where a boiler heats the water and a pump creates pressure to force the water through pipes so the hot water can be delivered to the desired location.

The motor on the pump is typically outside of the fluid environment, and the shaft connected to the motor transfers the energy of the motor from outside the fluid environment, to inside the fluid environment. Within the pump, there are several wear rings which serve to separate the higher pressure areas from lower pressure areas within the pump. These wear rings are sometimes referred to as seals, bushing such as throttle bushings, center-stage bushings, or balance drum bushings. The term wear rings is intended to include wear rings, seals, and bushing such as throttle bushings, center-stage bushings, and balance drum bushings.

The leakage across the wear rings is a significant factor in pump efficiency. Reducing the leakage increases pump efficiency.

SUMMARY

A device is disclosed including a wear ring formed as a hollow cylinder with an inside diameter and an outside diameter. In some embodiments the hollow cylinder may have multiple holes, which may be passages through the wear ring between the inside diameter and the outside diameter. The multiple passages between the inside diameter and the outside diameter may allow fluid under pressure to pass between the inside diameter and the outside diameter through the multiple passages.

The multiple passages between the inside diameter and the outside diameter may be relatively evenly spaced around the outside diameter. The hollow cylinder may have an inside radius (R), and a length (L), and an inside surface area. The inside surface area is measured as 2(pi)RL, and each of the multiple passages between the inside diameter and the inside diameter comprise a portion of the inside surface area. In an example embodiment a combination of the portions of the inside surface area from the multiple passages may be at least two percent of the inside surface area. In some embodiments a combination of the portions of the inside surface area from the multiple passages may be no more than twenty-five percent of the inside surface area. Another example embodiment includes a combination of the portions of the inside surface area from the multiple passages that are at least two percent of the inside surface area, and no more than twenty-five percent of the inside surface area. Another example embodiment includes a combination of the portions of the inside surface area from the multiple passages that are at least two percent of the inside surface area, and no more than ten percent of the inside surface area. Another example embodiment includes a combination of the portions of the inside surface area from the multiple passages that are at least two percent of the inside surface area, and no more than eight percent of the inside surface area.

The wear ring may be inserted into a housing having a solid wall in contact with the outside diameter of the wear ring. The wear ring may be made out of a material with a low coefficient of thermal expansion. The low coefficient of thermal expansion of the wear ring material may be equal to or lower than a coefficient of thermal expansion of carbon steel. An exemplary wear ring may be metal, such as stainless steel, 4/10 stainless for example, carbon steel, or any other suitable type of metal, as determined by the application requirements. The wear ring material may be impervious to water. The wear ring material may be a substantially chemically inert material.

The multiple passages between the inside diameter and the outside diameter may be a substantially uniform shape and size. The multiple passages may be holes each formed parallel to a radius of the hollow cylinder. In some embodiments the multiple passages between the inside diameter and the outside diameter may be formed at a nonparallel angle to a radius of the hollow cylinder.

A centrifugal pump is disclosed including an impeller, a rotating shaft, a wear ring, and a housing. The housing may have a solid housing wall, and the wear ring may be inserted into the housing against the solid housing wall. The impeller may be connected to the rotating shaft, and the rotating shaft may be supported by the wear ring. The shaft may pass through the thermoplastic wear ring. The wear ring may have multiple passages that allow fluid under pressure to pass between the rotating shaft and the solid housing wall.

The centrifugal pump may be a multi-stage high-pressure centrifugal pump.

A product made by a method is also disclosed including, forming a wear ring for use with a rotating shaft by forming a hollow cylinder from wear ring material. The hollow cylinder having an inside diameter and an outside diameter. The method of making the product may include forming multiple passages in the hollow cylinder through the wear ring material between the inside diameter and the outside diameter, such that the multiple passages between the inside diameter and the outside diameter allow fluid under pressure to pass between the inside diameter and the outside diameter through the multiple passages. The multiple passages may be formed by drilling multiple holes in the hollow cylinder. The multiple passages may be formed using a process that forms the multiple passages at the same time that the hollow cylinder is formed. The multiple passages may also be formed using three-dimensional printing of a suitable medium or a mold. The hollow cylinder may be inserted into a metal housing having a solid housing wall.

A wear ring for the rotating shaft of a centrifugal pump is also disclosed which may include an outer layer made from a solid metallic material, and an inner layer contacting the outer layer. The inner layer may be made from a metallic or nonmetallic material, and may have a first side configured to be in close proximity to a rotating shaft in the centrifugal pump. The inner layer may have a second side which is in contact with the outer layer. The inner layer may have multiple holes between the first side and the second side.

The holes in an exemplary wear ring may be sized to relieve pressure gradients from an outside surface to an inside gap or to prevent a pressure differential between the outside diameter of the wear ring and the inside diameter of the wear ring and may be offset either radially or axially to enhance pressure distribution and interrupt flow of fluid around the shaft or between the wear ring and the shaft housing. Holes through the wear ring may be circular in shape, oval, rectangular, irregular shaped or slots. Holes may have a maximum dimension such as diameter of about ⅛ inch or more, or about 3/16 inch or more, or about ¼ inch or more, about ⅜ inch or more and any range between and including the dimensions provided. A hole through a wear ring may be a slot, having an aspect ratio between the length and width of the slot of about 1.5:1 or more, about 2:1 or more, about 3:1 or more, about 4:1 or more and any range between and including the slot aspect ratios provided. An exemplary slot may have a slot length of about of about ⅛ inch or more, or about 3/16 inch or more, or about ¼ inch or more, about ⅜ inch or more, about ½ inch or more and any range between and including the dimensions provided. Again, a slot hole may have a slot radial and/or axial offset angle as described herein.

An exemplary wear ring may be made of a metallic or non-metallic material. When the wear ring is made out of a metallic material, the gaps between the shaft and the wear ring may be larger than gaps used with non-metallic wear rings.

In an exemplary method, a wear ring is configured with an outer diameter that closely matches the inner diameter of a housing and the wear ring is press fit into the housing. In some case, a wear ring may be cooled and/or the housing heated to enable the wear ring to be inserted into housing, such as by press fitting. When the two components reach similar temperatures, such as room temperature, a tight fit between the two components will be ensured.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
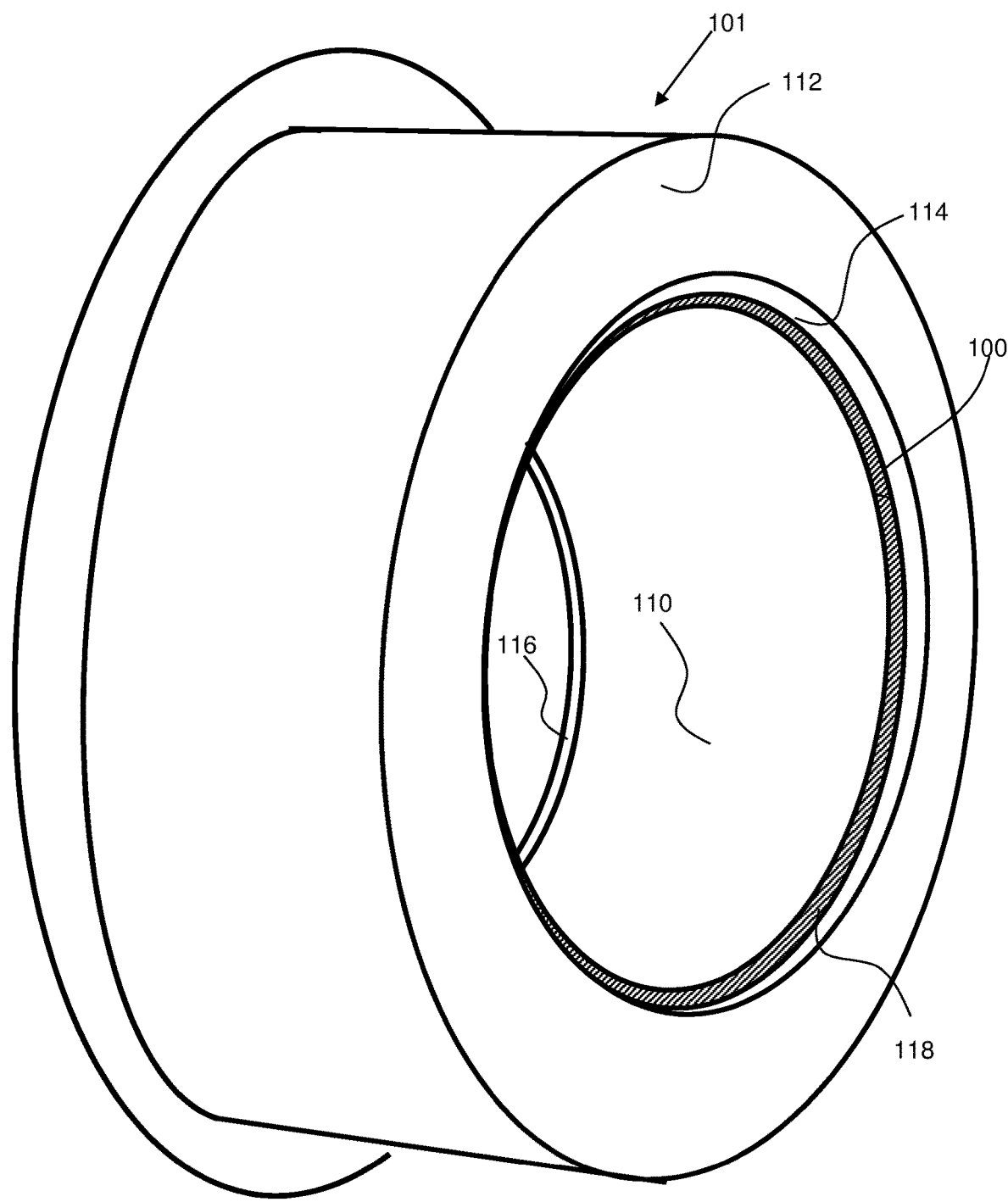
FIG. 1 is a perspective view of an embodiment of a wear ring.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. Other embodiments of the invention, and certain modifications, combinations and improvements of the described embodiments, will occur to those skilled in the art and all such alternate embodiments, combinations, modifications, improvements are within the scope of the present invention.

The disclosed embodiments provide advantages over the current state of technology in pump seals in one or more ways. In an example embodiment a wear ring includes a wear ring that is pressed into a metal casing or housing with running clearance between the shaft and the wear ring. The seal separates a high pressure environment and a low pressure environment (low being relative to the high pressure environment). When there is a large enough pressure differential between the high pressure side and the low pressure side, the pressure can act on the wear ring to move the wear ring along the shaft and out of the casing, which would cause failure of the wear ring.

A stopping structure such as a shoulder can be used on the low pressure side to prevent the wear ring from moving. A system similar to the one shown in FIG. 1 was constructed and analyzed. FIG. 1 shows part of an exemplary pump 101 having a wear ring assembly 100 that can be used as a seal for a rotating shaft. In this example the wear ring assembly 100 has a metal housing 112 and a wear ring 110. The metal housing 112 has a shoulder 114 that is part of the metal housing 112 and acts as a stop for the wear ring 110. In this example a shaft may be used with the wear ring assembly 100, and the clearance between the shaft and the wear ring may be according to specifications for a system, which may be a centrifugal pump, reducing leakage through the seal, results in greater efficiency of the system. It is desirable to reduce vibrations in the shaft that can negatively affect performance of the system. The side with the shoulder 114 is a low pressure side 118, which is a low pressure relative to the opposite side of the wear ring assembly 100, which is a high pressure side 116.

With the example of FIG. 1 failures were identified where the wear ring deformed due to pressure of a high pressure differential system. In some cases, the wear ring deformed sufficient to move the wear ring over the shoulder 114, causing significant reduction in the performance of the system, or failure of the system.

The failure was caused by fluid pressure acting on the wear ring 110. The internal diameter of the wear ring 110 had high pressure applied due to the high pressure environment on the high pressure side 116, and the pressure was lower when calculated closer to the shoulder 114. The pressure in the system of FIG. 1 was found to be pressing outward on the inner diameter of the wear ring 110 with a greater force at the high pressure side 116 than at the shoulder 114 or low pressure side 118. Fluid pressure was also found to act on the outer diameter of the wear ring 110, between the wear ring 110 and the housing 112. The pressure on the outer diameter of the wear ring 110, however, was near or equal to the high pressure of the high pressure side 116 on both the high pressure side 116 and at the low pressure side 118 by the shoulder 114. The example of FIG. 1 and FIG. 2 show a nonmetallic wear ring.

Figure 2:
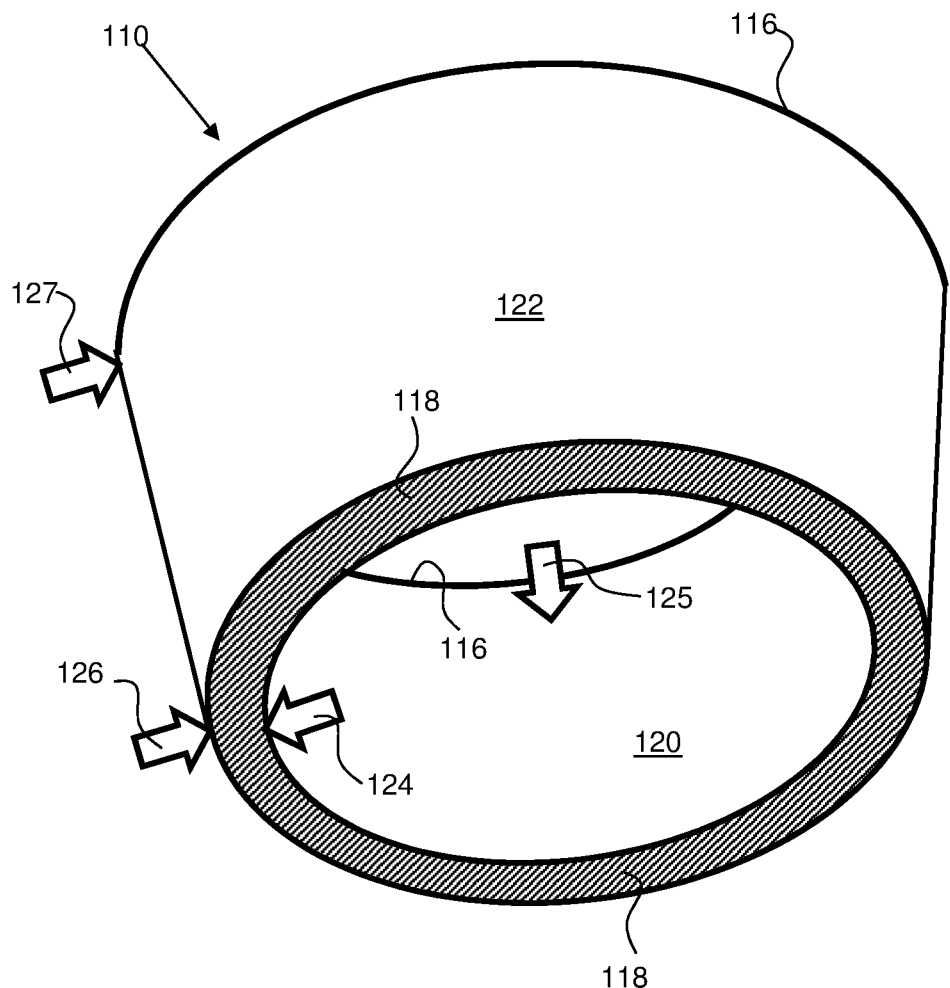
FIG. 2 is a perspective view of a wear ring.

FIG. 2 shows an exaggerated example of the deformation caused by the pressure differential as discussed above regarding the system of FIG. 1, with a lower pressure 124 acting on the inner diameter 120 of the wear ring 110 on the low pressure side 118, and a higher pressure 126 acting on the outer diameter 122 of the wear ring 110 at the low pressure side 118. It was found that the high pressure 127 on the outer diameter 122 of the wear ring 110 was acting on the wear ring 110 with an inward force that was substantially the same on both the high pressure side 116 and the low pressure side 118 of the system.

In one case study with the wear ring of FIG. 1, the pressure in a high pressure environment is around 3210 PSI and the pressure in the low pressure environment, is around 1600 PSI. The high pressure at about 3210 PSI acts on the outer diameter 122 of the wear ring 110, between the wear ring 110 and the housing 112. The high pressure acts substantially at the same pressure on the high pressure side 116 and the low pressure side 118 on the outer diameter 122 of the wear ring, with a pressure of about 3210 PSI. The pressure in the inner diameter of the wear ring, between the wear ring 110 and the shaft varies (in this case study the clearance is about 8 to 10 thousandths of an inch between the shaft and the wear ring 110). Near the high pressure side 116, the pressure on the inner diameter 120 of the wear ring is about 3200 PSI. The pressure acting on the inner diameter of the wear ring 110 decrease regularly from the pressure 125 of 3210 PSI at the high pressure side 116, to the pressure 124 of 1600 PSI at the low pressure side 118.

The nonmetallic material used for the wear ring 110 of FIG. 1 and FIG. 2 may be deformable, and will deform when placed under conditions of high pressure differential. The nonmetallic material may also be subjected to high temperatures, such as the temperatures in a centrifugal pump used to move hot water in a heating system, which high temperatures may decrease the pressure differential needed to deform the wear ring material.

In failure analysis of the case study, it was found that the pressure differential between the outer diameter 122 and the inner diameter 120 of the wear ring 110 would cause deformation of less than 1 thousandths of an inch at the high pressure side 116 where the pressure differential between the outer diameter and the inner diameter was very small. The deformation at the low pressure side 118, however, would be around 27 thousandths of an inch, which was determined to be the cause of the system failure, since there was only a clearance of 8-10 thousandths of an inch between the wear ring and the shaft.

Figure 3:
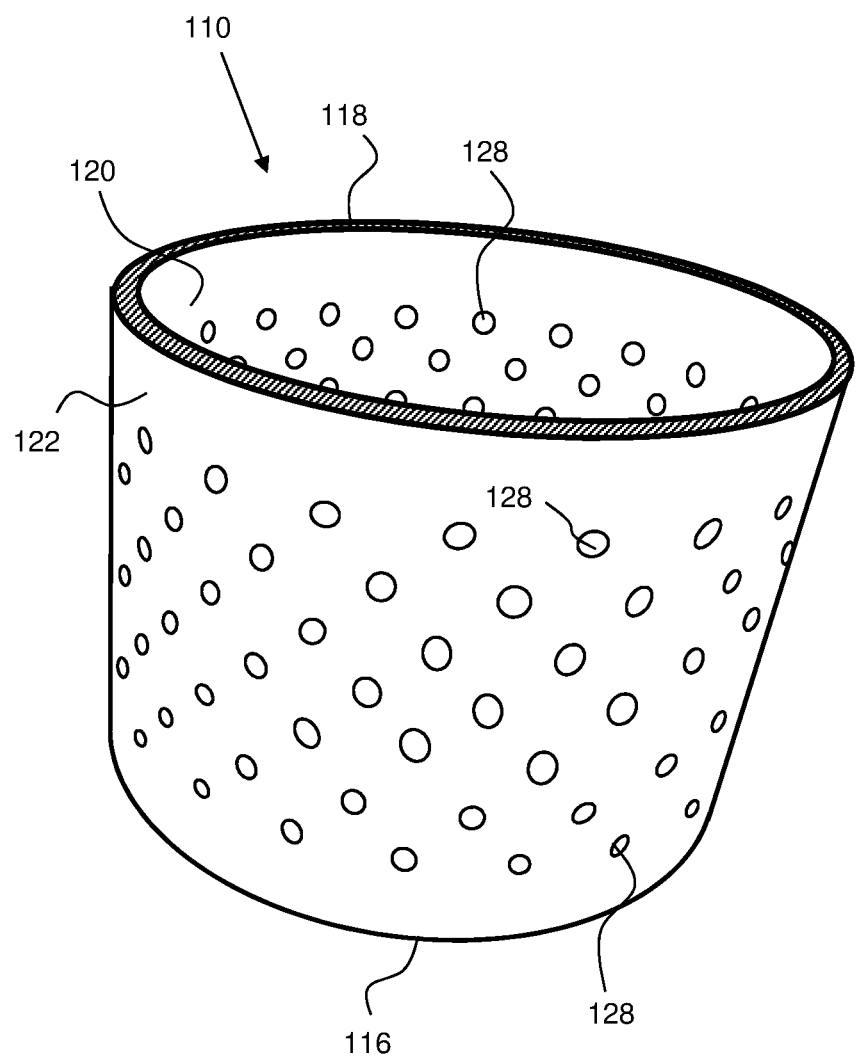
FIG. 3 is a perspective view of a wear ring with holes.

To solve this problem, the wear ring was modified as shown in FIG. 3, with holes 128 formed through the wear ring from the outer diameter 122 to the inner diameter 120 at regular intervals. This allows the pressure from the outer diameter to be relieved through the holes 128 so that a large pressure differential does not form between the outer diameter and the inner diameter of the wear ring 110.

Analysis based on the same conditions discussed in the case study above showed that the wear ring of FIG. 3 had less than 2 thousandths of an inch deformation in the direction of the radial axis (or in the direction of the radius of the shaft, which may be a rotating shaft radius), which is an acceptable deformation for a running clearance of 8-10 thousandths of an inch.

The holes 128 were also found to provide a benefit to absorb deformation in the axial axis (or in the direction of the axis of the shaft). In the case study with a pressure differential of 1600 PSI between the high pressure side 116 and the low pressure side 118, axial deformation occurs, and the holes 128 become slightly elongated as deformation is able to occur.

Another advantage of placing holes 128 in the wear ring is a reduction of tangential whirl of the fluid between the inner diameter of the wear ring 110, and the shaft. The holes create a disruption to the flow of fluid as it rotates with the shaft. Tangential whirl can de-stabilize a system.

The wear ring with holes may also have the effect of reducing net leakage in some systems. The holes can act to disrupt axial flow of fluid. The wear ring with holes can be used with other features to reduce tangential whirl, such as labyrinth fingers connected to the shaft or rotor, which may correspond to groves or structures on an opposing surface from the shaft or rotor. The holes 128 may provide the advantage of reducing tangential whirl and disrupting axial flow regardless of whether the wear ring 100 is metallic or nonmetallic.

Although axial flow of fluid may be reduced by the holes, they still allow flow so that the Lomakin Effect is still able to stabilize the shaft.

The use of holes in the wear ring may be used on long or short seals, and is only pressure-limited by the high temperature strength of the nonmetallic material used. An exemplary wear ring may be made out of a nonmetallic material including, but not limited to, thermoplastics, composites and chemically-resistant polymers. In some embodiments the nonmetallic material includes a resin, for example PFA (perfluoroalkoxy) and then press filling a sleeve of the PFA resin with carbon fibers with random link orientation of the carbon fibers. In some embodiments the nonmetallic material includes about eighty percent resin and twenty percent carbon fibers. In one example the material of the nonmetallic material is sold under the trademark Du Pont™ Vespel™ CR-6100.

An exemplary wear ring may be made out of a metal or metallic material including, but not limited to, steel, stainless steel, titanium, alloys of various metals and the like. Again the type of metal used may depend on the application requirements.

The technique described may be applied to narrow wear rings such as wear rings. Long or short seals may be used with holes to prevent or reduce distortion from pressure differentials as well as other benefits.

Figure 4:
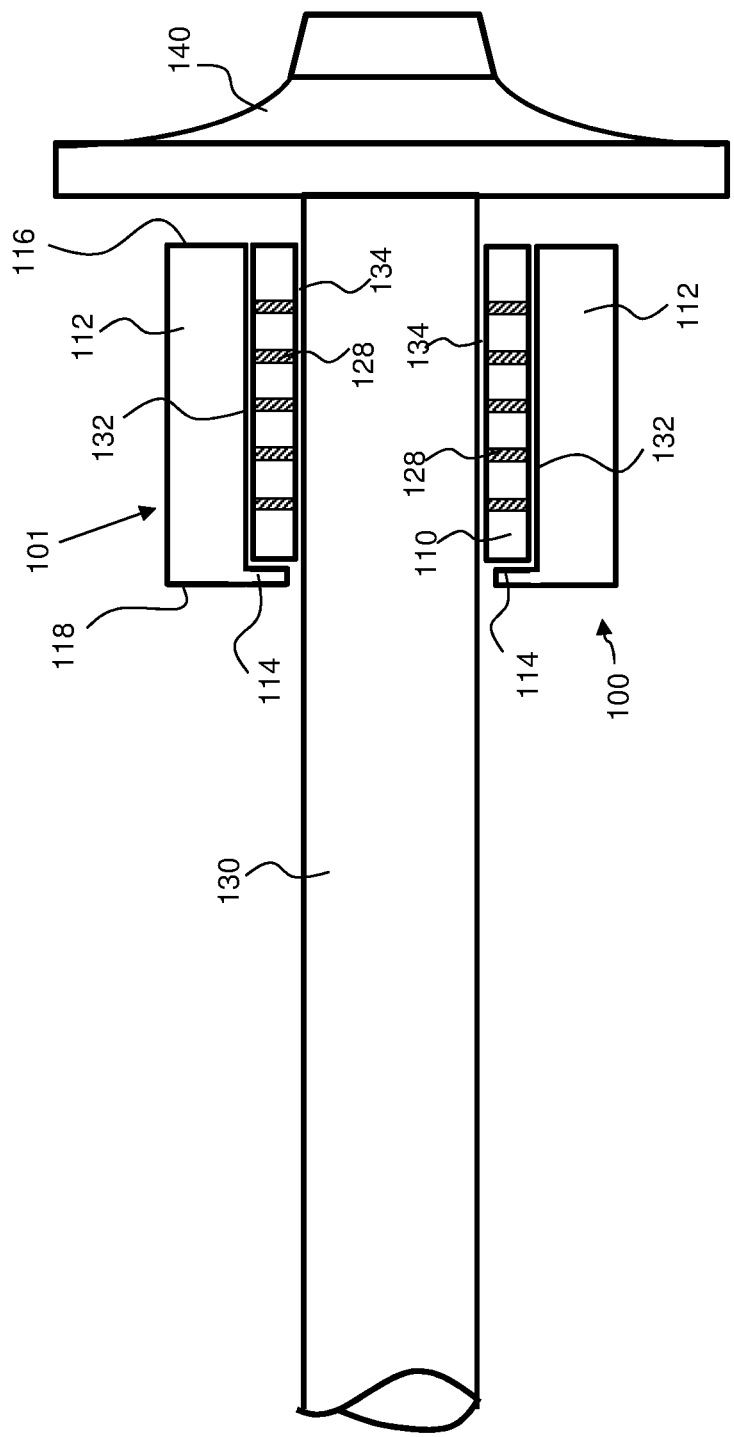
FIG. 4 is a side cut away view of a wear ring with a shaft and impeller.

FIG. 4 shows part of an example pump 101 having a shaft 130 and an impeller 140 with the wear ring assembly 100 as generally shown in FIG. 3. The wear ring assembly 100 separates a high pressure side 116 on the side of the impeller 140 from a low pressure side 118. The wear ring assembly 100 in this example includes a housing 112 with a shoulder 114 at the low pressure side 118. The housing 112 may include a solid housing wall 132. The wear ring 110 may be press fit into the housing 112 so that the outside diameter of the wear ring is against the solid housing wall 132. The wear ring 110 in this example has holes 128 that are formed parallel to the radius of the wear ring 110. The holes 128 may be formed at different angles, and may be round, square, or other shapes. The holes 128 may be a uniform size and shape, or may be different sizes and shapes in one wear ring.

FIG. 4 shows a gap 134 between the shaft 130 and the wear ring 110. This gap 134 allows the shaft to rotate, and also allows fluid in the gap 134.

The holes 128 may be formed by drilling holes in a wear ring before it is press fit into a housing 112. The holes 128 may also be formed by with a mold, for example the wear ring 110 may be formed with an injection molding process. The holes may also be formed with a three-dimensional printing process.

Figure 5:
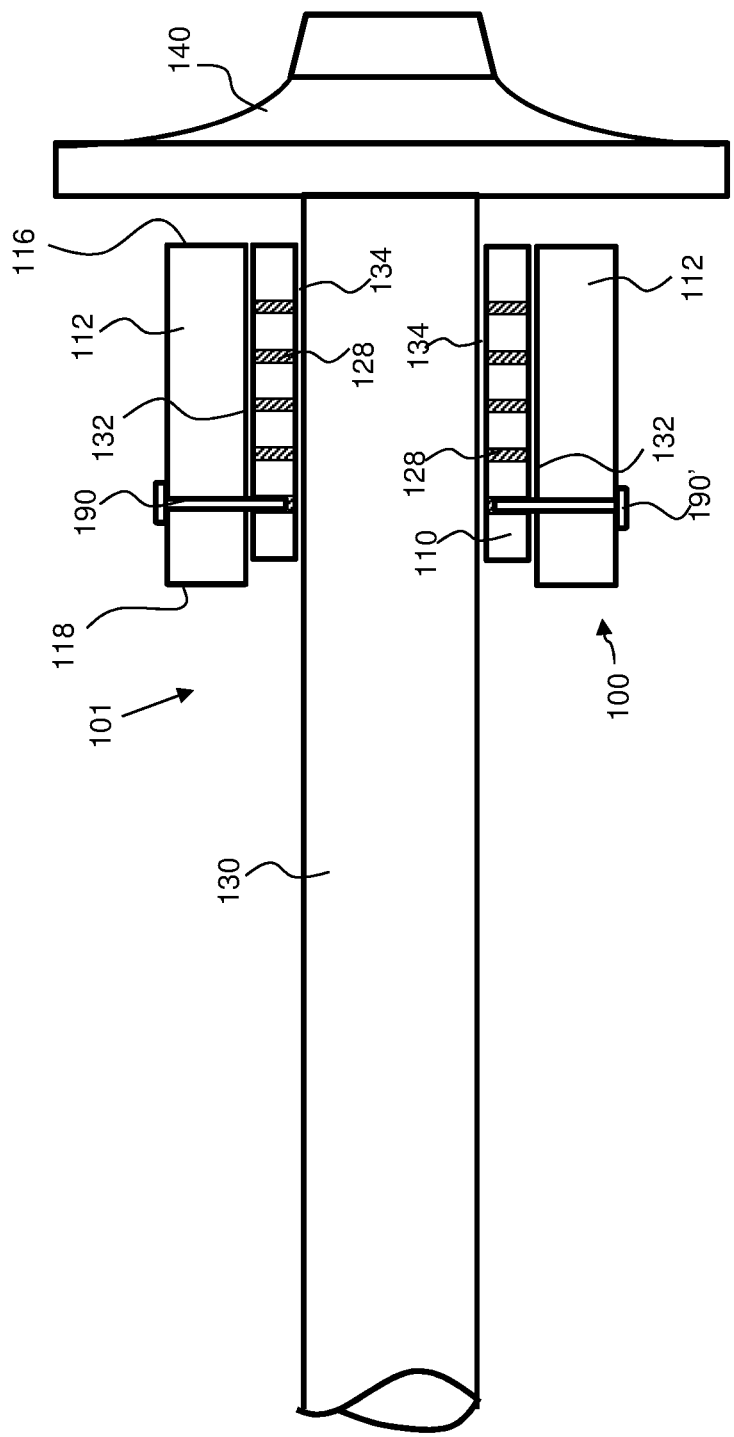
FIG. 5 shows a side cut away view of an exemplary wear ring with retainer pins.
Figure 6:
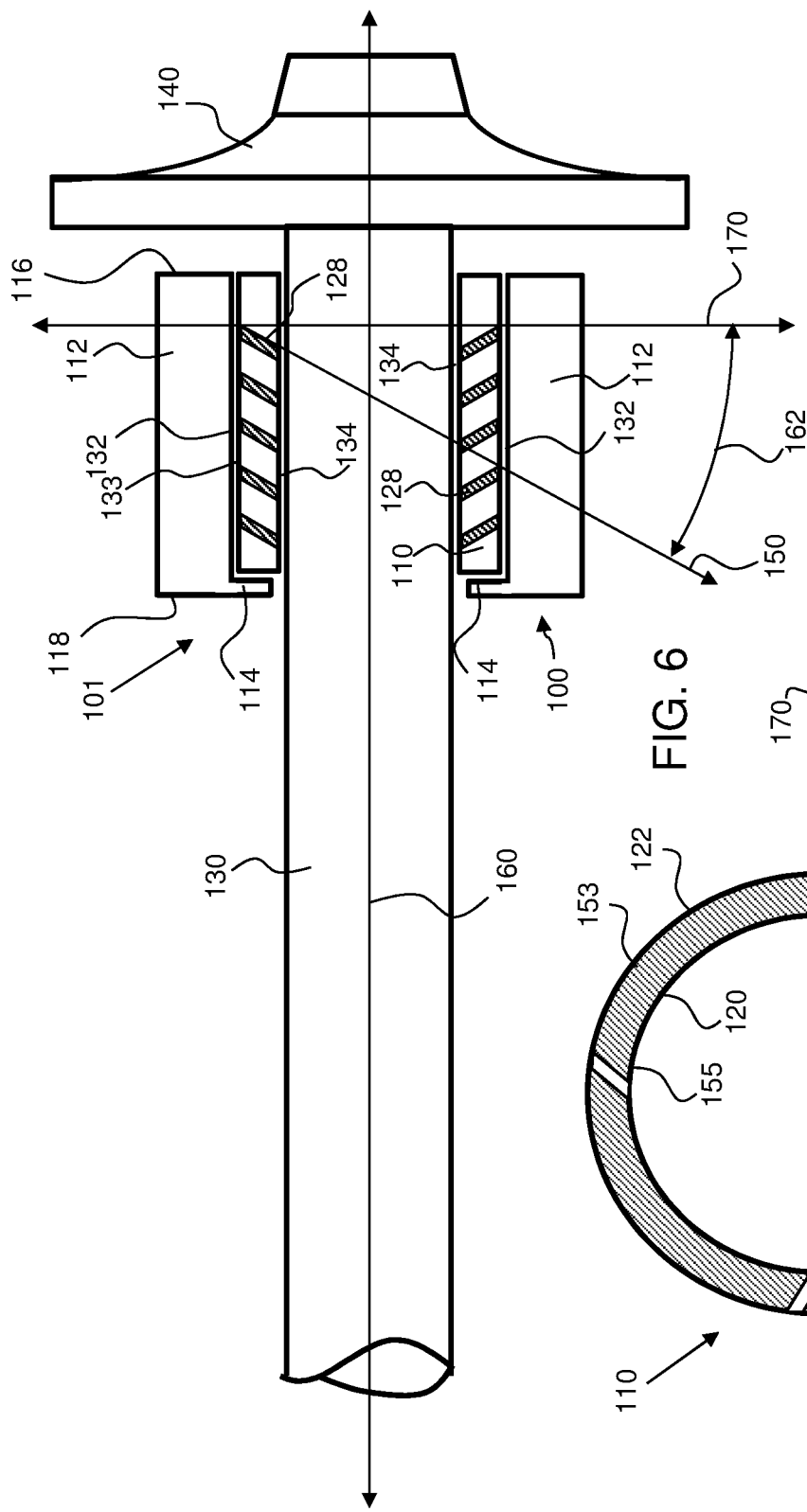
FIG. 6 shows a side cut away view of an exemplary wear ring having offset holes therethrough.
Figure 7:
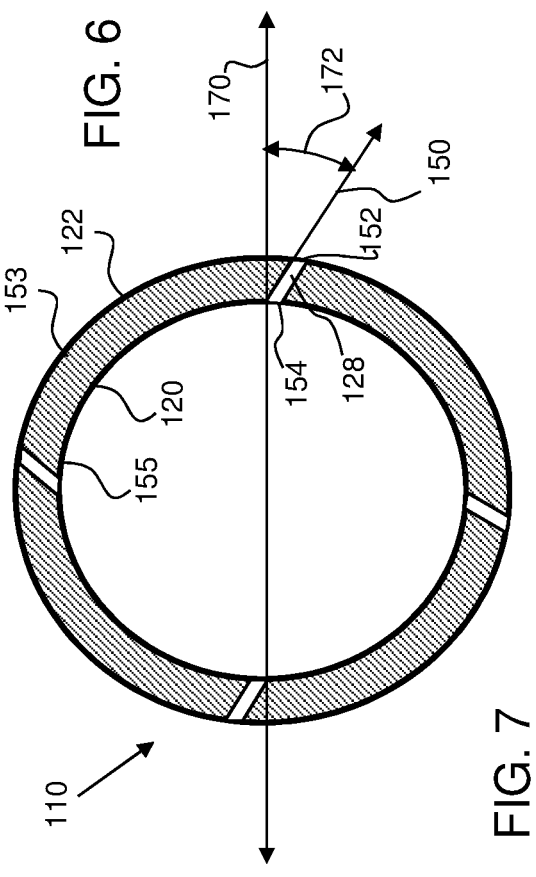
FIG. 7 shows an axial cut away view of an exemplary wear ring having radially offset holes therethrough.
Figure 8:
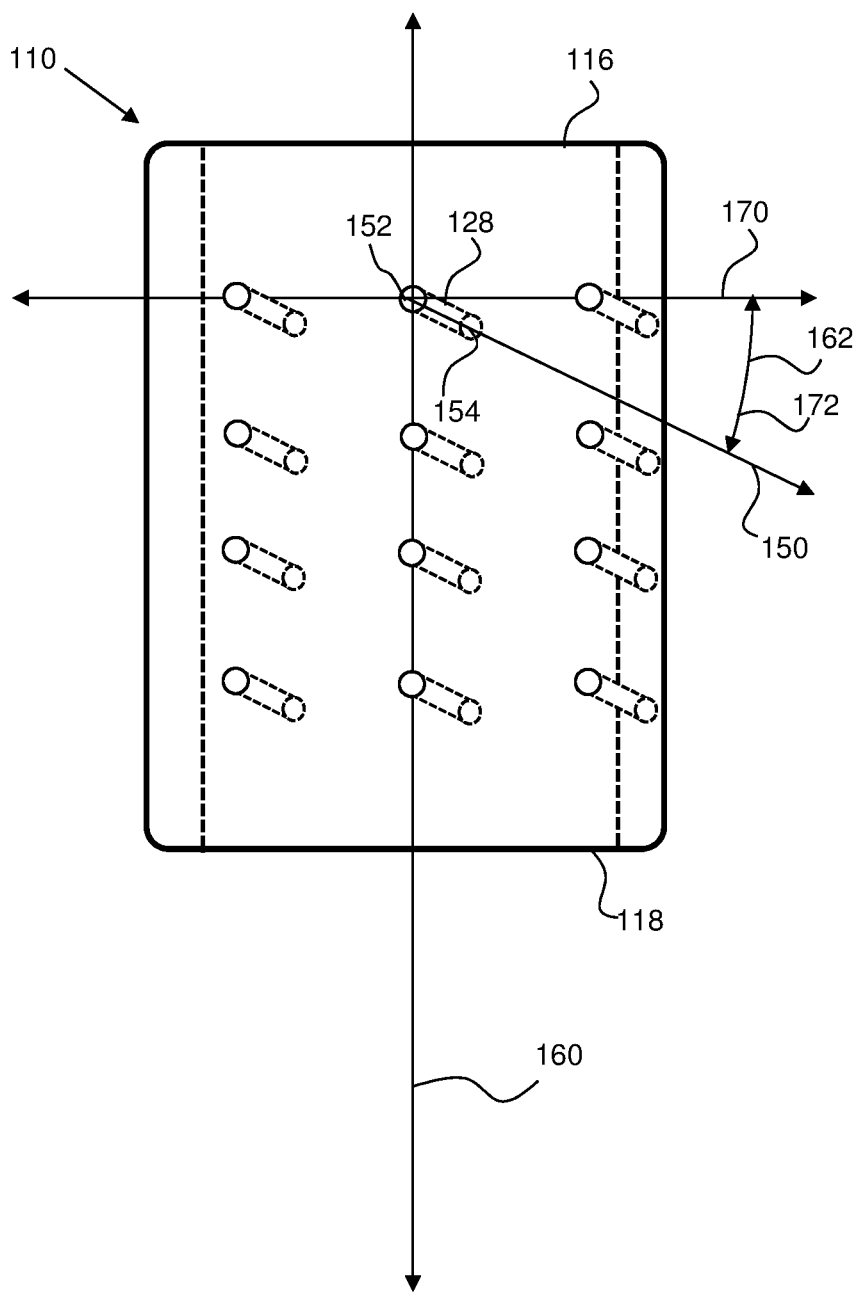
FIG. 8 shows a top view of an exemplary wear ring having holes that have a radial offset and an axial offset.

Referring now to FIGS. 4 to 8, an exemplary pump 101 is configured with a wear ring assembly 100 around the shaft 130. As shown in FIG. 4, the wear ring is retained around the shaft by a retainer, a shoulder 114, extending from the metal housing 112 radially inward at least a portion of the thickness of the wear ring. As shown in FIG. 5, the wear ring is retained by a retainer. In some embodiments pins 190, 190', that extend from the metal housing 112 into at least a portion of the thickness of the wear ring 110, and may extend into one of the holes 128. A pin may be a cylindrical shaped post or a screw or bolt having threads to engage with the wear ring. A retainer may be a threaded bolt or screw that includes a head that is inserted into the wear ring from the inner diameter, where the wear ring includes a countersink to receive the head of the bolt or screw. The wear ring has a plurality of holes 128 that extend from the outside diameter 122 or outside surface 153 to the inside diameter 120 or inside surface 155. As shown in FIG. 6, these holes have an axial offset 162, wherein the inside opening 154 of the hole is offset axially from the outside opening 152 of the hole on the outside surface 153. Put another way, the hole axis 150 or axis along the length of the hole extends at an offset angle perpendicular to the axial axis 160, or some angle offset from the radial axis 170. The axial offset 162 may help to relieve differential pressure at the outside surface 153 to the inside gap 134, as the pressure at the outside opening 152 is closer to the high pressure side 116 than the inside opening 154. The axial offset 162 angle may be about 10 degrees or more, about 20 degrees or more, about 30 degrees or more, about 45 degrees or more and any range between and including the axial offset 162 angles provided. A wear ring may also have holes that have a radial offset, wherein the outside opening 152 of the hole is not aligned radially with the inside opening 154, as best shown in FIG. 7. The hole axis 150 of the hole is offset from the radial axis 170 by the radial offset 172 angle. A radial offset angle of the holes may disrupt any spiraling flow creating by the spinning shaft. The radial offset 172 angle may be about 10 degrees or more, about 20 degrees or more, about 30 degrees or more, about 45 degrees or more and any range between and including the radial offset angles provided. As shown in FIG. 8, an exemplary wear ring 110 has a hole that have both an axial offset 162 and a radial offset 172. The hole axis 150 extends at an offset angle to the both the radial axis 170 and the axial axis 160. The outside opening 152 of the hole is closer to the high pressure side 116 than the inside opening 154, and the outside opening is not aligned with the inside opening radially.

Figure 9:
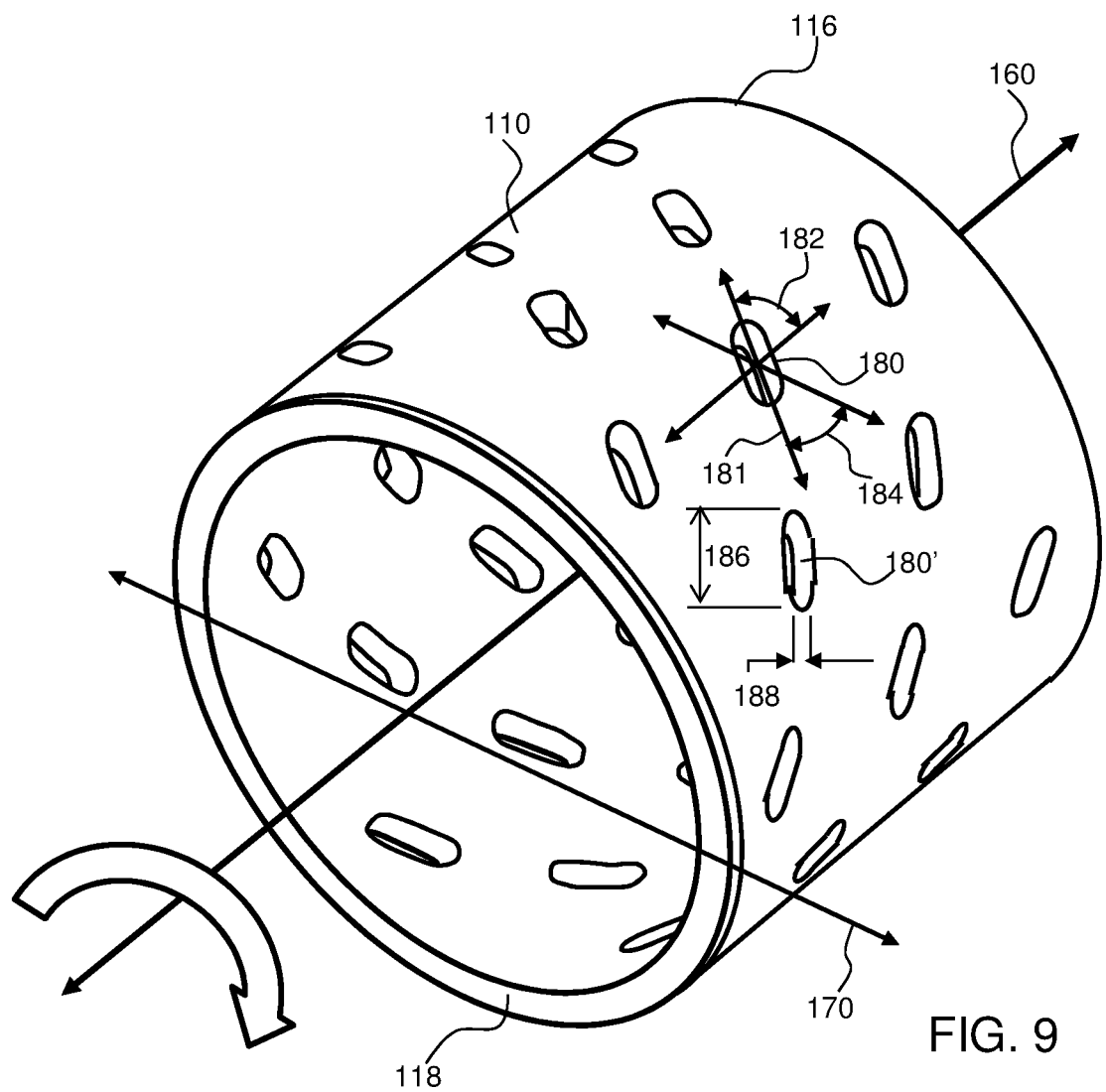
FIG. 9 shows a perspective view of an exemplary wear ring having slot holes having a slot length that is offset axially.

As shown in FIG. 9, an exemplary wear ring assembly 100 has a plurality of slot holes 180, 180' having a slot length 186 and slot width 188. A slot length axis 181, or line extending along the length of the slot may have a slot axial offset 182 wherein the length of the slot is offset from the axial axis 160. In addition, a slot may have a slot radial offset 184 wherein the slot does not extend perpendicularly through the thickness of the wear ring assembly 100. The slot axial offset 182 and/or the slot radial offset 184 may be about 10 degrees or more, about 20 degrees or more, about 30 degrees or more, about 45 degree or more and any range between and including the radial offset angles provided. A slot hole may equilibrate pressure gradients between the outside surface 153 and the inside surface 155 or gap 134. In addition, the shape and geometry of the slot hole may be selected to reduce flow of fluid caused by the spinning shaft.

For at least one embodiment, applicant validated the usefulness of the design described herein with finite element analysis and in operating pumps up to 2,320 psi differential pressure. Applicant performed testing to determine the reduction of leakage across seals, and found that leakage was reduced by twenty-five percent more than a plain seal. Further, the design described in some embodiments herein increased rotor-dynamic damping coefficient of the seals by a factor of three to four times compared to a plain seal at typical running speeds.

In some embodiments the holes 128 may extend partially through the wear ring from the inside surface 155 without extending all the way through to the outside surface 153. In some embodiments the holes extend through at least five percent through the wear ring. In another embodiment the holes extend through at least ten percent through the wear ring. In another embodiment the holes extend through at least twenty-five percent through the wear ring. In another embodiment the holes extend through at least fifty percent through the wear ring. In another embodiment the holes extend through no more than fifty-five percent through the wear ring. In another embodiment the holes extend through no more than thirty percent through the wear ring. In another embodiment the holes extend through no more than ten percent through the wear ring. The holes may extend at least through five percent of the wear ring, and through no more than fifty-five percent through the wear ring and any range between and including the percentages provided.

In one test performed, two pumps with the same specifications were compared, where one pump used wear rings, center bushings and throttle bushings with a nonmetallic insert as shown in FIG. 1 (original design) without the holes or passages shown in FIGS. 3-5. While a second pump with wear rings, center bushings and throttle bushings with a nonmetallic insert including the design elements described (upgraded design) and shown in some embodiments of FIGS. 3-5 were used. The capacity of both pumps were 1,210 gallons per minute, the head value of the pumps were 6,099 ft for the original design, and 6,290 ft for the upgraded design. The brake horse power was 2,923 HP for the original design, and 2,608 HP for the upgraded design. The efficiency was measured at 59.30 percent for the original design, and 68.50 percent for the upgraded design. In this test the upgraded design showed an improvement in efficiency of 9.2 percent. The upgraded design was used for two years in a pump without issues in starting and stopping the pump, when problems are more likely, and without an increase in power consumption or a decrease in the performance of the upgraded pump design.

Figure 10:
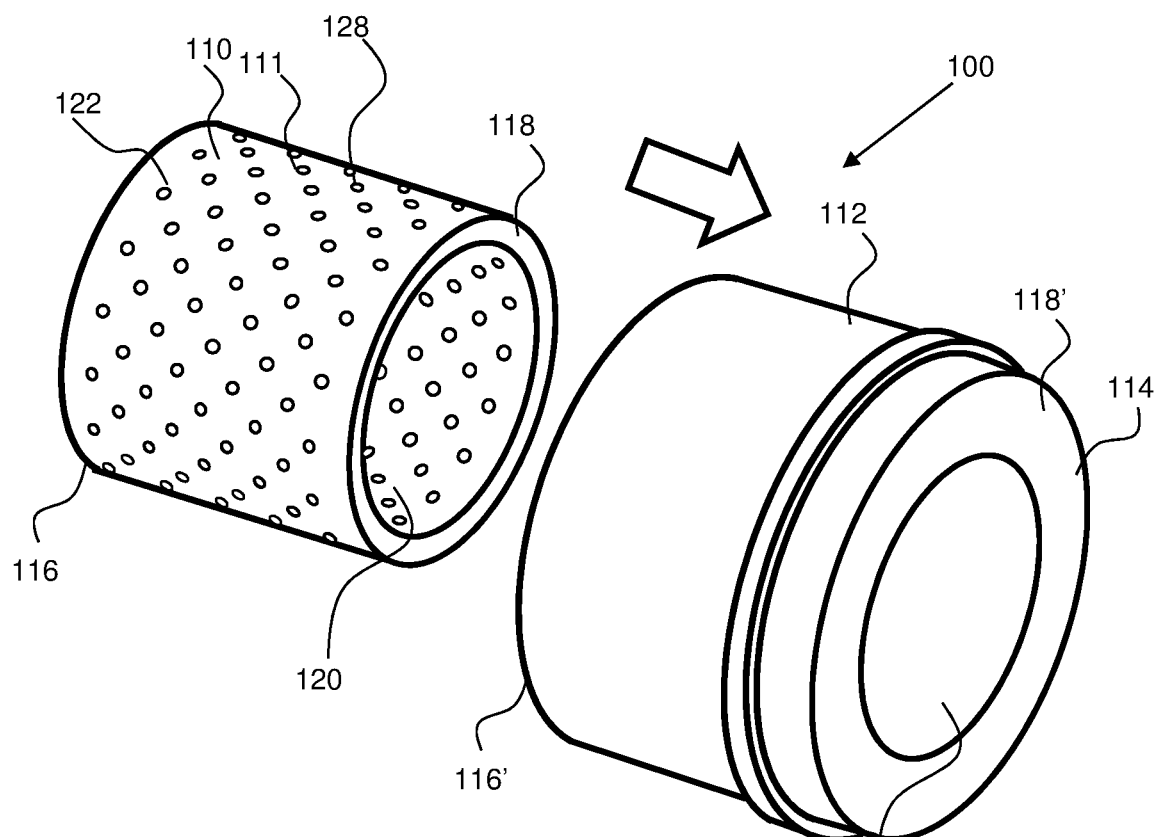
FIG. 10 shows an exemplary metal wear ring configured for insertion into a housing.
Figure 11:
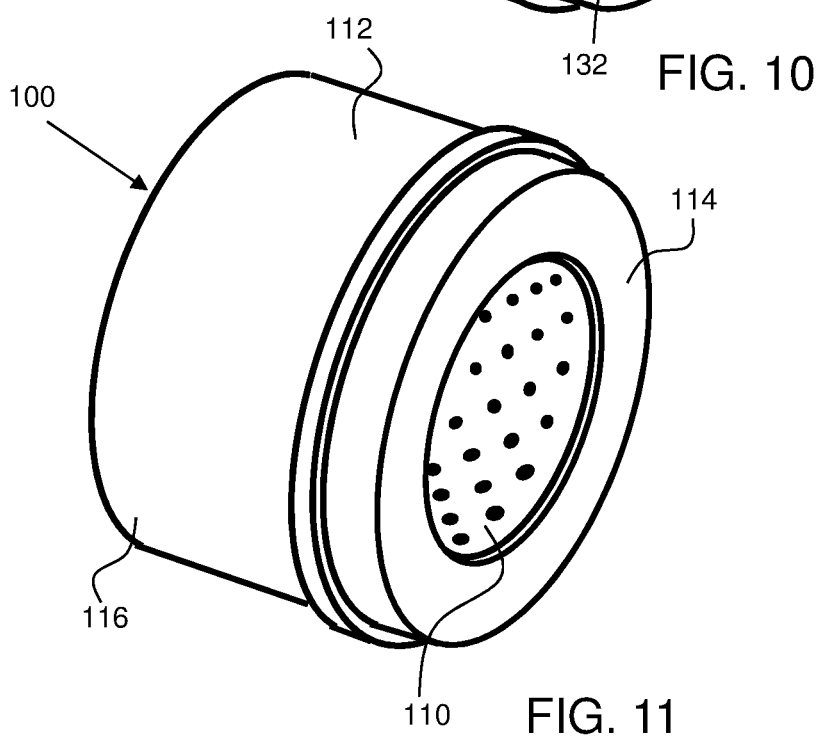
FIG. 11 shows the exemplary metal wear ring of FIG. 10 configured in the housing.

As shown in FIGS. 10 and 11, an exemplary wear ring 110, such as a metallic wear ring, or a wear ring made of metal, is configured for insertion into the housing 112. The exemplary housing has a shoulder 114, to retain the metal wear ring on the low pressure side 118'. The metal wear ring has a plurality of holes 128 that extend from the outside surface through to the inside surface, or from the outer diameter 122 to the inner diameter 120. The exemplary wear ring is an apertured wear ring 111, comprising through holes as shown. As described herein the wear ring may be cooled to shrink it slightly and the housing may be heated to expand it slightly to enable the wear ring to fit within the housing. It may require the wear ring to be press fit into the housing. The tolerance or gap between the outside diameter 122 of the wear ring and the inside diameter of the housing, or inner housing wall 132, may be very small, such as 1/1000 of an inch.

Figure 12:
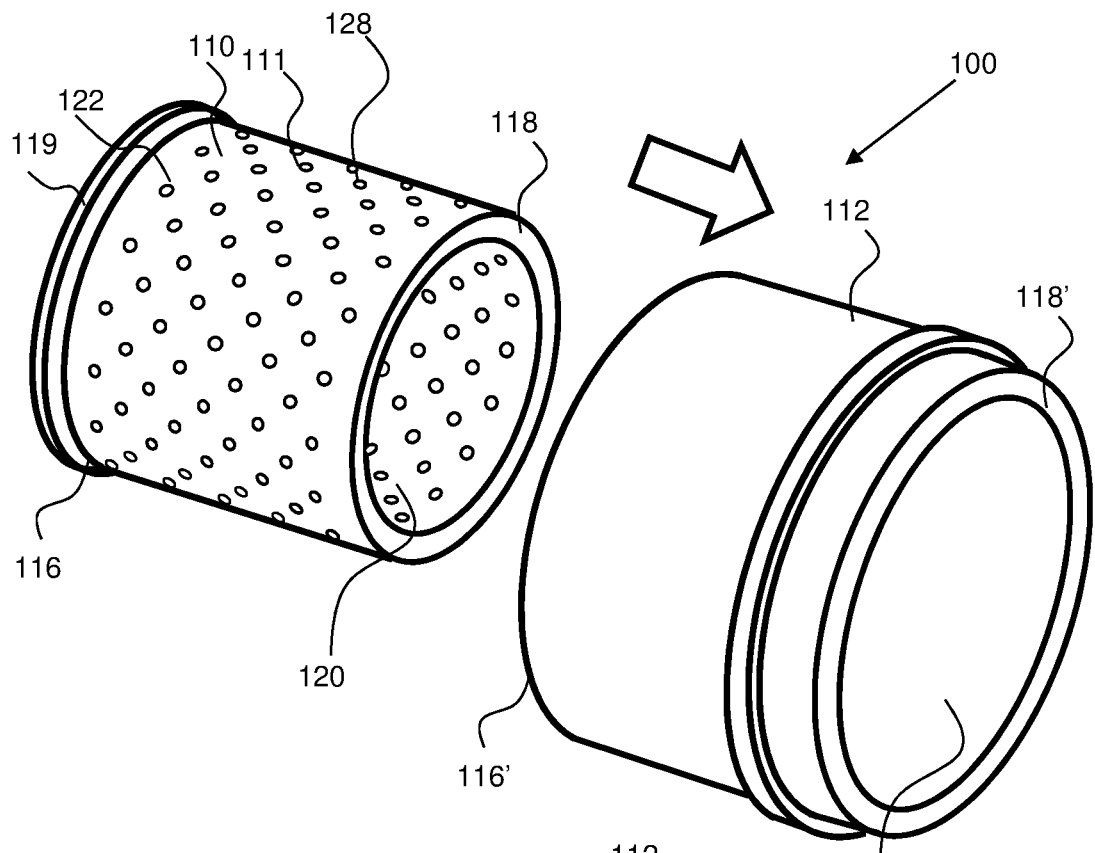
FIG. 12 shows an exemplary metal wear ring having a flange and configured for insertion into a housing.
Figure 13:
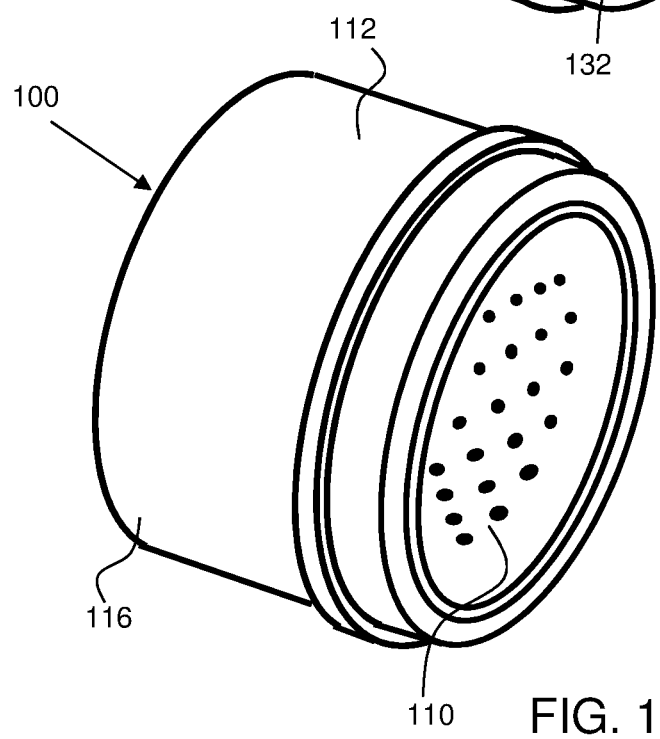
FIG. 13 shows the exemplary metal wear ring of FIG. 12 configured in the housing with the flange on the high pressure side.

As shown in FIGS. 12 and 13, an exemplary wear ring 110, such as a metallic wear ring having a flange 119, is configured for insertion into the housing 112. The exemplary wear ring is an apertured wear ring 111, comprising through holes 128 as shown. The exemplary wear ring has a flange 119 to retain the metal wear ring on the high pressure side 116' of the housing. The metal wear ring has a plurality of holes 128 that extend from the outside surface through to the inside surface, or from the outer diameter 122 to the inner diameter 120. In some embodiments a metal wear ring may be installed with a friction fit that does not require a stopping device such as a shoulder or a pin.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A pump comprising:
a housing having a solid wall and a retainer extending from the housing
an impeller configured for rotational movement;
a shaft connected to the impeller and extending through the housing;
a wear ring configured in the housing to reduce axial flow of fluid under pressure between a high pressure side and a low pressure side of the wear ring, the shaft extending through the wear ring along an inside surface of the wear ring, the inside surface having an inside radius (R), and a length (L), and an inside surface area measured as 2(pi)RL, the retainer retaining the wear ring against a force exerted by fluid on the high pressure side to prevent movement of the wear ring relative to the housing, the wear ring configured with a plurality of holes extending between the solid wall and the inside surface, the plurality of holes forming a portion of the inside surface area; and
a gap between the shaft and the wear ring, wherein fluid on the high pressure side flows between the shaft and the wear ring, wherein fluid on the high pressure side flows through the plurality of holes.

2. The pump of claim 1, wherein the plurality of holes comprise slot holes having a slot length and slot width.

3. The pump of claim 2, wherein at least a portion of the slot holes have an axial offset angle.

4. The pump of claim 2, wherein the slot holes have a radial offset angle.

5. The pump of claim 2, wherein at least a portion of the slot holes have an axial offset angle and a radial offset angle.

6. The pump of claim 1, wherein at least a portion of the plurality of holes have an axial offset angle.

7. The pump of claim 1, wherein at least a portion of the plurality of holes have a radial offset angle.

8. The pump of claim 1, wherein at least a portion of the plurality of holes have an axial offset angle and a radial offset angle.

9. The pump of claim 1, wherein the retainer is a shoulder extending toward the shaft on the low pressure side of the wear ring.

10. The pump of claim 1, wherein the retainer is a pin extending from the housing into a portion of the wear ring.

11. The pump of claim 1, wherein the wear ring includes a resin and carbon fibers with random link orientation.

12. The pump of claim 1, wherein the plurality of holes are a uniform shape and size.

13. The pump of claim 1, wherein the plurality of holes are formed parallel to a radius of the shaft.

14. A wear ring configured around a shaft to reduce axial flow of fluid under pressure between a high pressure side and a low pressure side of the wear ring, comprising:
an outer layer formed of a first material, and having a retainer extending from the outer layer;
an inner layer contacting the outer layer, the inner layer formed of a second material, the inner layer having an inside surface with an inside radius (R), and a length (L), and an inside surface area measured as 2(pi)RL, the shaft extending through the wear ring along the inside surface, the retainer extending from the outer layer toward the inner layer to retain the inner layer against a force exerted by fluid on the high pressure side to prevent movement of the inner layer relative to the outer layer, the inner layer configured with a plurality of holes extending from the inside surface toward the outer layer, the plurality of holes forming a portion of the inside surface area; and a gap between the shaft and the inner layer, wherein fluid on the high pressure side flows between the shaft and the inner layer, wherein fluid on the high pressure side flows into the plurality of holes.

15. The wear ring of claim 14, wherein the plurality of holes are evenly spaced around the inside surface area.

16. The wear ring of claim 14, wherein the plurality of holes are a uniform shape and size.

17. The wear ring of claim 14, wherein the plurality of holes are each formed parallel to a radius of the shaft.

18. The wear ring of claim 14, wherein the plurality of holes comprise slot holes having a slot length and slot width.

19. The wear ring of claim 18, wherein at least a portion of the slot holes have an axial offset angle.

20. The wear ring of claim 14, wherein at least a portion of the plurality of holes have an axial offset angle and a radial offset angle.

* * * * *